United States Patent Office 2,993,053
Patented July 18, 1961

2,993,053
PRODUCTION OF N-CARBOXY-α-AMINO ACID ANHYDRIDES
Denis George Harold Ballard, Holyport, near Maidenhead, England, assignor to Courtaulds Limited, London, England, a British company
No Drawing. Filed Apr. 9, 1959, Ser. No. 805,138
Claims priority, application Great Britain Apr. 11, 1958
7 Claims. (Cl. 260—307)

This invention relates to the production of N-carboxy-α-amino acid anhydrides.

It is known that phosgene reacts with α-amino acids to produce corresponding N-carboxy anhydrides. Thus Fuchs in Berichte, vol. 55 (1922), page 2943, reported the preparation of N-phenylglycide N-carboxy anhydride from N-phenylglycine and phosgene using water as solvent. The general reaction proceeds as follows:

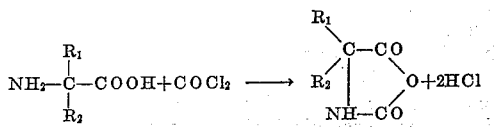

In these formulae $R_1$ and $R_2$ represent hydrogen or monovalent hydrocarbon radicals which may also be substituted, or together they may form a ring.

In carrying out this process it is possible to modify the conditions, as is described in British patent specification No. 646,033 of Imperial Chemical Industries Limited, whereby, in addition to N-carboxy anhydrides, acid chloride derivatives, namely:

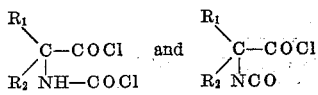

are obtained. I have found that such compounds are usually formed as by-products in appreciable amounts even when the conditions set out in the said specification No. 646,033 are used in order to favour the production of anhydrides.

It is also known that N-carboxy anhydrides of the type mentioned above can be converted into polymers, which are polyamides and are more usually referred to as polypeptides, the polymerisation being effected with the evolution of carbon dioxide. By controlling the conditions of polymerisation as described in the Hanby et al. Patent No. 2,598,372 the polypeptides obtained are fibre-forming, and fibres can be made as described in the Bamford et al. Patent No. 2,697,085 and the corresponding British patent specification No. 675,299. For the manufacture of polypeptides and particularly those polypeptides intended for making fibres, the presence of acid chloride compounds in the original N-carboxy anhydride has been found undesirable.

The present invention sets out conditions for carrying out the phosgene-α-amino acid reaction whereby the amount of acid chloride compounds formed is reduced to small proportions.

The present invention is based on observations I have made that if the average particle size of the α-amino acid is reduced to very small dimensions, namely 5 microns or less, the reactivity of the acid towards phosgene is considerably increased; I have also found that by controlling the rates of feed of the two reactants so that there is no substantial excess of either reagent at any stage during the reaction, the very large surface/volume ratio achieved with the very fine particles of acid assists in maintaining the desired equivalence by ensuring rapid reaction of the acid with the phosgene to form the desired anhydride, thereby reducing the tendency for acid chloride compounds to be formed.

According to one feature of this invention therefore, in the manufacture of N-carboxy-α-amino acid anhydrides by reacting phosgene with an α-amino acid the size of the α-amino acid used is not greater than 5 microns (1 micron being $10^{-6}$ metres).

According to a further feature of this invention, the mixing of the phosgene and the α-amino acid having an average particle size not greater than 5 microns is so controlled that there is substantialy no excess of either reagent in the reaction mixture at any time during the reaction, the total amount of phosgene used being substantially equivalent to the α-amino acid as required by the general reaction set out in the equation set out above.

The reaction between phosgene and α-amino acids is heterogeneous and it has been disclosed in the above-mentioned British patent specification No. 646,033 that the amino acid used should be finely-ground. A considerable increase in the reactivity of the α-amino acid towards phosgene is obtained by using an average particle size of 5 microns but even greater increases in reactivity are obtained by reducing the average particle size to 1 micron or less.

The α-amino acids have a tendency to aggregate during grinding and the fineness required for carrying out this invention cannot generally be achieved by the usual dry grinding or by grinding in the presence of materials containing very small amounts of water. Mechanical grinding devices are used for plolonged times, that is to say of the order of 18 to 24 hours in order to obtain the fineness required for this invention. It is preferred to use a ball-mill or colloid mill for the grinding. In an alternative procedure, the α-amino acid is dissolved in water and spray-dried as an extremely fine spray. When using a ball-mill or colloid-mill, the milling should be effected in the presence of a dry organic liquid which is a solvent for phosgene. The solvent used must be free from water and if necessary it should be dried, for example over a water-absorbing salt, as the presence of water during the grinding tends to cause aggregation, that is a complete reversal of the grinding action. The presence of 1 part of water per 1000 parts of organic liquid has been found sufficient to cause aggregation.

In order to prevent a build up of excess reagents it is preferred to add the phosgene, preferably as a solution, and the finely divided amino acid as a dispersion in the form of two separate streams to a rapidly stirred diluent which is normally a solvent for the phosgene, the rates of feed of the streams being arranged so that equivalent quantities of the reagents are being added continuously to the diluent. The two streams may be mixed together immediately before being added to the diluent.

In carrying out this invention the phosgene may be used in the form of a gas, liquid or solution, the rate of feed being controlled as described so that substantially no excess of phosgene over the α-amino acid is allowed to form. Gaseous phosgene is conveniently used for large scale operations where the feed of the gas may be controlled accurately as by rotameters. As phosgene liquefies at 8.3° C., only moderate refrigeration is required to permit the use of liquid phosgene.

In general, the addition of the phosgene can be conveniently and adequately controlled by using it in the form of a solution. In order that the reaction of the phosgene and the amino acid can be carried out at a convenient rate, the solvent used for this purpose should preferably boil at a temperature of 60° C. or over. The solvent should also preferably be capable of ready removal by distillation from the final reaction mixture. For these reasons it is preferred to use a solvent boiling in the range of 60 to 110° C. Examples of such solvents are dioxane, ethyl acetate, benzene, tetrahydrofurane, methyl propionate, chloroform and carbon tetrachloride. The reaction will, however, take place at lower temperatures using phosgene solutions and lower boiling solvents such as methyl acetate and methylene chloride can be used; an increase in reaction rate with such solvents may be achieved by carrying out the reaction under pressure in pressurized equipment. Solvents boiling at temperatures above 110° C. may be used, for example toluene or a xylene, but are not so readily removed by distillation.

As already indicated, the reaction of this invention is carried out in the presence of a diluent to which the phosgene, as gas, liquid or solution, and the finely divided amino acid are added as separate streams. The diluent should preferably be a solvent for the phosgene and when using a phosgene solution it may be the same as that used to dissolve the phosgene. Any of the solvents specified above, for example dioxane, methylene chloride, chloroform and ethyl acetate, may be used.

In carrying out the reaction in a diluent liquid as described, it is desirable that the concentration of the amino acid in the diluent should be kept relatively low, for example from 3 to 15 percent by weight of amino acid based on the weight of the diluent. This precaution is advisable because the hydrochloric acid formed in the reaction has a tendency to attack the anhydride product particularly when the anhydride is present in high concentrations.

However, it is possible to build up high concentrations of the N-carboxy anhydride in the diluent by carrying out the reaction as a series of stages, each stage consisting in adding equimolecular proportions of the amino acid and phosgene to the diluent as described and at the end of each stage removing the hydrochloric acid formed for example by blowing dry air through the reaction mixture.

The process of this invention may be applied to any α-amino acid having the general formula given above. Specific examples are glycine, proline, alanine, leucine, phenalalanine, valine, norvaline, norleucine, isoleucine, gamma-methyl-L-glutamate, gamma-benzyl-L-glutamate and α-aminoisobutyric acid; the optically active or racemic forms of the acid may be used.

The N-carboxy anhydrides obtained by the process of this invention in a single stage, in general, contain less than 2 gram mol percent of chlorine, based on the N-carboxy anhydride. The anhydrides can be very readily purified by removing the acid chlorides by the method described and claimed in my application Serial No. 805,137 filed herewith according to which the anhydride is recrystallized from an organic solvent, such as chloroform, methylene chloride or benzene containing a small proportion, e.g. about 10 percent by volume, of a substituted formamide such as N.N-dimethyl formamide or a substituted acetamide which, by increasing the solubility of the acid chloride compounds in the main solvent, facilitates the removal of any small amount of acid chlorides which may be present. By a single crystallisation, anhydrides containing less than 0.1 gram mol percent of chlorine are obtained. These anhydrides may be polymerised by known methods to produce fibre-forming polypeptides.

The invention is illustrated by the following examples. In all the examples the chlorine contents referred to were determined by potentiometric titration of the solution of the anhydride in dilute nitric acid, the amount of chlorine being expressed as gram mol percent based on the N-carboxy anhydride. This amount of chlorine is calculated from the expression $Mx/100W$ where $x$ is the number of cc. of 0.1 N silver nitrate solution required for neutralization, $W$ is the weight of the N-carboxy anhydride and $M$ is its molecular weight. The reduced viscosity is defined as $\eta_{sp}/c$ where $\eta_{sp}$ is the specific viscosity of a solution having a concentration of $c$ grams per 100 cc.; in all cases $c$ was 0.5.

Example 1

97 grams of gamma-methyl-L-glutamate were milled in a colloid mill for 24 hours with 720 grams of dry dioxane as the dispersing medium until the maximum particle diameter was 5 microns, the average size being about 1 micron.

1555 grams of dioxane were placed in a glass vessel fitted with a rapidly rotatable stirrer and provided with an external electrical heating device for temperature control. The vessel had two feed pipes containing valves to control the rate of flow and the whole unit was made gas-tight to prevent escape of phosgene. The dispersion of gamma-methyl-L-glutamate was added to the rapidly stirred dioxane at 50° C. through one feed pipe and a solution of 61 grams of phosgene in 310 grams of dioxane was added through the other pipe; the rates of feed were adjusted so that equivalent quantities of the two reagents were being added continuously to the diluent and so that the reagents were added over 30 minutes; the temperature was maintained at 50° C. throughout. At the end of this time complete conversion of the gamma-methyl-L-glutamate to the anhydride had been achieved.

The dioxane was removed by vacuum distillation at 40° C. and the resulting oil was crystallised by adding 100 cc. of petrol (by which in these examples I mean a mixture of paraffinic hydrocarbons having a boiling point range of 40 to 60° C.). 110 grams of crude gamma-methyl-L-glutamate N-carboxy anhydride containing 0.5 percent of chlorine were obtained. On recrystallising from a solution of 116 grams of chloroform and 9.3 grams of N.N-dimethyl formamide (10 percent by volume) according to the method claimed in my application Serial No. 805,137, 84 grams of the pure anhydride (containing less than 0.01 percent of chlorine) were obtained.

The 84 grams of gamma-methyl-L-glutamate N-carboxy anhydride were dissolved in a mixture of 173 grams of dioxane and 906 grams of methylene chloride and polymerised by the addition of 1.38 grams of tri-n-butylamine, producing a solution containing 64.2 grams of a fibre-forming poly-gamma-methyl-L-glutamate. The reduced viscosity of this polymer was 2.52 measured in dichloracetic acid.

Example 2

38 grams of gamma-methyl-L-glutamate were milled for 24 hours in a colloid mill using 280 grams of dry dioxane as dispersing medium. When the average particle diameter had been reduced to less than 5 microns, the resulting suspension was added to 610 grams of dioxane at 50° C. together with 24 grams of phosgene dissolved in 121 grams of dioxane in the manner described in Example 1. The remainder of the preparation was conducted in the manner described in Example 1 to give 43 grams of crude gamma-methyl-L-glutamate N-carboxy anhydride, having a chlorine content of 0.7 percent. Recrystallisation from chloroform containing 10 percent by volume of N.N-dimethyl formamide gave 32 grams of gamma-methyl-L-glutamate N-carboxy anhydride with 0.03 percent chlorine content.

32 grams of gamma-methyl-L-glutamate N-carboxy anhydride dissolved in 420 grams of methylene chloride were polymerised by the addition of 0.53 gram of tri-n-butylamine, producing a solution containing 24.2 grams of a fibre-forming poly-gamma-methyl-L-glutamate. The reduced viscosity of this polymer was 1.46 measured in dichloracetic acid.

Example 3

700 grams of gamma-methyl-L-glutamate hydrochloride were milled for 24 hours in a colloid mill, using 6200 grams of dry dioxane as dispersing medium, until the maximum particle diameter was 5 microns. The resulting suspension was added to 10,300 grams of dioxane maintained at 50° C. throughout the reaction together with 360 grams of phosgene dissolved in 2060 grams of dioxane the reactants being added in the manner described in Example 1. Reaction was complete after 40 minutes. The dioxane was removed by vacuum distillation to yield a yellow oil which was crystallised by the addition of petrol to give 650 grams of crude N-carboxy anhydride, the chlorine content of which was 0.44 percent. Recrystallisation from chloroform containing 10 percent by volume of N.N-dimethyl formamide in the manner described in Example 1 gave 500 grams of chlorine-free gamma-methyl-L-glutamate N-carboxy anhydride.

The 500 grams of gamma-methyl-L-glutamate N-carboxy anhydride were polymerised in 5340 grams of methylene chloride and 1033 grams of dioxane using 8.35 grams of tri-n-butylamine to initiate the polymerisation. After five hours reaction was complete and a clear colourless solution containing 380 grams of poly-gamma-methyl-L-glutamate was obtained. The reduced viscosity of this polymer was 3.04 measured in dichloracetic acid.

Example 4

150 grams of D-alanine were milled in a colloid mill for 18 hours using 258 grams of dry dioxane as the dispersing medium and then ground further by ball milling for 24 hours. This reduced the average particle diameter to less than 5 microns. This suspension of D-alanine was added to 13,400 grams of dioxane at 50° C. together with 171 grams of phosgene dissolved in 500 grams of dioxane in the manner described in Example 1. The temperature was maintained at 50° C. throughout the reaction and all the D-alanine was converted to D-alanine N-carboxy anhydride after 90 minutes.

The dioxane was removed by vacuum distillation at 40° C. and the resulting oil crystallised by adding 100 cc. of petrol (boiling range 40 to 60° C.). After filtration of the solid and drying, 192 grams of D-alanine N-carboxy anhydride were obtained. The chlorine content was 0.7 percent and this was removed by recrystallisation of the N-carboxy anhydride from 153 cc. of chloroform containing 10 percent by volume of N.N-dimethyl formamide. The quantity of pure D-alanine N-carboxy anhydride obtained was 163 grams.

The 163 grams of chlorine-free D-alanine N-carboxy anhydride were dissolved in 3940 grams of nitrobenzene containing 0.142 gram of n-hexylamine. The polymerisation was completed in 24 hours at a temperature of 35° C. 100 grams of poly-D-alanine were produced which had a reduced viscosity of 2.89 measured in trifluoracetic acid.

Example 5

28 grams of gamma-benzyl-L-glutamate were milled for 24 hours in a ball mill, using 100 grams of dry dioxane as the dispersing medium, until the average particle diameter was less than 5 microns. The resulting suspension was added to 350 grams of dioxane together with 12 grams of phosgene dissolved in 50 grams of dioxane in the manner described in Example 1. The temperature was maintained at 50° C. throughout the reaction and all the gamma-benzyl-L-glutamate was converted to N-carboxy anhydride in 30 minutes.

The dioxane was removed by vacuum distillation at 40° C. and the yellow oil produced was crystallised by the addition of 30 cc. of petrol (boiling range 40 to 60° C.). After filtration and drying the yield of gamma-benzyl-L-glutamate N-carboxy anhydride was 31 grams and it contained 0.4 percent of chlorine. Recrystallisation from 60 mls. of ethyl acetate containing 10 percent by volume of N.N-dimethyl formamide gave 24 grams of gamma-benzyl-L-glutamate containing no chlorine.

Example 6

100 grams of gamma-methyl-L-glutamate hydrochloride were ball-milled for 18 hours in the presence of 600 cc. of dry ethyl acetate to produce a dispersion having an average particle size of 3 microns. The dispersion was added at a controlled rate to 2100 cc. of ethyl acetate at 67° C. which were stirred, and at the same time 51 grams of phosgene gas were bubbled into the ethyl acetate at such a rate that equivalent quantities were entering the reactor. The addition required 20 minutes. The ethyl acetate was distilled off at atmospheric pressure. The yield, on crystallisation, was 94 grams containing 1.8 percent of chlorine. On recrystallising from chloroform containing 10 percent of dimethyl formamide, 75 grams of chlorine-free N-carboxy anhydride were obtained.

Example 7

20 parts of gamma-methyl-L-glutamate were ground for 24 hours in a ball mill with 96 parts of ethyl acetate, which had been dried over anhydrous potassium carbonate, until the average particle size was less than 1 micron. 640 parts of ethyl acetate were stirred at a temperature of 67 to 68° C.; a solution of 10.3 parts of phosgene dissolved in 60 parts of ethyl acetate and the gamma-methyl-L-glutamate dispersion were then added slowly in equivalent proportions to the stirred ethyl acetate over a period of 90 minutes in the manner described in Example 1, the temperature being maintained at 67 to 68° C. A current of dry air was then bubbled through the reaction mixture, which originally contained 0.33 mol/litre of hydrochloric acid, until the mixture contained 0.09 mol/litre of hydrochloric acid. A further 20 parts of gamma-methyl-L-glutamate dispersion similar to the first dispersion and a further solution of 10.3 parts of phosgene in 60 parts of ethyl acetate were then added in equivalent proportions in the same manner to the stirred mixture at 67 to 68° C. over a period of 105 minutes. A current of dry air was then passed through the mixture so that the concentration of hydrochloric acid was reduced from 0.35 mol/litre to 0.09 mol/litre.

The procedure of slowly adding a dispersion containing 20 parts of gamma-methyl-L-glutamate and 10.3 parts of phosgene in ethyl acetate solution and passing dry air through the resultant mixture was carried out a third time to produce a solution with a hydrochloric acid content of 0.10 mol/litre. The procedure was then carried out a fourth time, including the final treatment with dry air, and the product was then separated as described in Example 1 to yield 68 parts of gamma-methyl-L-glutamate N-carboxy anhydride containing 3.2 percent of chlorine. The chlorine figures at the earlier stages were (1) 1.5 percent, (2) 1.8 percent and (3) 3.2 percent, respectively. On recrystallising twice from chloroform containing 10 percent by volume of dimethyl formamide, the N-carboxy anhydride contained 0.03 percent of chlorine.

Example 8

700 grams of gamma-methyl-L-glutamate were ground for 24 hours in a ball mill in 5 litres of dry dioxane until the average particle size was less than 1 micron. 360 grams of phosgene dissolved in 2 litres of dioxane and the dispersion of gamma-methyl-L-glutamate were then added slowly in equivalent proportions as described in Example 1 to 10 litres of stirred dioxane at 55° C. The reaction mixture was then aerated with dry air to remove as much of the free hydrochloric acid as possible. A further dispersion of 600 grams of gamma-methyl-L-glutamate in 3.5 litres of dioxane ground to an average particle size of less than 1 micron and a further 310 grams of phosgene dissolved in 2 litres of dioxane were then added slowly in equivalent proportions to the stirred reaction mixture at 55° C. The mixture was then aerated as described a second time and the product was isolated as described in Example 1. The N-carboxy anhydride obtained contained 1.3 percent of chlorine and on recrystallising twice from chloroform containing 10 percent by volume of dimethyl formamide a chlorine-free compound was obtained.

What I claim is:

1. A process for the manufacture of N-carboxy-α-amino acid anhydrides which comprises preparing a suspension of an α-amino acid in a dry organic liquid selected from the group consisting of methyl acetate, methylene chloride, dioxane, ethyl acetate, benzene, tetrahydrofurane, methyl propionate, chloroform, carbon tetrachloride, toluene, and xylene by grinding the α-amino acid in the dry organic liquid until the average particle size of the acid has been reduced to not greater than 5 microns, and adding the dispersion so prepared and a solution of phosgene in the same organic liquid as that used to prepare the dispersion of the acid to an additional stirred volume of the said dry organic liquid, the rates of addition of the said dispersion and said solution being so controlled that there is substantially no excess of either reagent in the reaction mixture at any time during the reaction, the total amount of phosgene used being that which is substantially equivalent to the α-amino acid used.

2. A process for the manufacture of N-carboxy-α-amino acid anhydrides which comprises preparing a suspension of an α-amino acid in a dry organic liquid selected from the group consisting of methyl acetate, methylene chloride, dioxane, ethyl acetate, benzene, tetrahydrofurane, methyl propionate, chloroform, carbon tetrachloride, toluene, and xylene by grinding the α-amino acid in said dry organic liquid until the average particle size has been reduced to not greater than 5 microns, adding the dispersion so prepared to an additional stirred volume of said dry organic liquid, and passing phosgene into said volume of organic liquid containing said dispersion.

3. The process claimed in claim 2 wherein the average particle size of the α-amino acid is not greater than 1 micron.

4. The process claimed in claim 2 wherein the dry organic liquid boils between about 60° C. and about 110° C.

5. The process claimed in claim 2 wherein the organic liquid is dioxane.

6. The process claimed in claim 2 wherein the organic liquid is ethyl acetate.

7. A process for the manufacture of N-carboxy-α-amino acid anhydrides which comprises preparing a suspension of an α-amino acid in a dry organic liquid selected from the group consisting of methyl acetate, methylene chloride, dioxane, ethyl acetate, benzene, tetrahydrofurane, methyl propionate, chloroform, carbon tetrachloride, toluene, and xylene by grinding the α-amino acid in said dry organic liquid until the average particle size has been reduced to not greater than 5 microns, and adding the dispersion so prepared and a solution of phosgene in said dry organic liquid to an additional stirred volume of said dry organic liquid.

References Cited in the file of this patent

FOREIGN PATENTS 646,033    Great Britain _____ Nov. 15, 1950